United States Patent [19]
Brody et al.

[11] Patent Number: 5,682,652
[45] Date of Patent: Nov. 4, 1997

[54] ADJUSTABLE TIE-DOWN STRETCH CORD

[75] Inventors: Scott D. Brody, Dedham, Mass.; Ricky W. Selby, Danielson, Conn.

[73] Assignee: Tiger Products, Inc., Sharon, Mass.

[21] Appl. No.: 689,897

[22] Filed: Aug. 15, 1996

Related U.S. Application Data

[63] Continuation-in-part of Ser. No. 351,487, Dec. 7, 1994.
[51] Int. Cl.⁶ ........................................... A44B 21/00
[52] U.S. Cl. .................... 24/300; 24/130; 24/265 H; 24/598.5
[58] Field of Search ..................... 24/300, 301, 130, 24/482, 715.3, 370, 68 CD, 598.5, 265 H, 905

[56] References Cited

U.S. PATENT DOCUMENTS

| | | | |
|---|---|---|---|
| 269,399 | 12/1882 | Ensign. | |
| 904,747 | 11/1908 | Anderson. | |
| 1,452,338 | 4/1923 | Flowers. | |
| 2,296,082 | 9/1942 | Bierk .................................. | 24/130 |
| 4,361,938 | 12/1982 | Emery ................................ | 24/130 |
| 4,622,724 | 11/1986 | Dupre ................................ | 24/130 |
| 4,831,692 | 5/1989 | Chuan ............................... | 24/300 |
| 4,998,495 | 3/1991 | Bos et al. ......................... | 24/130 |
| 5,317,788 | 6/1994 | Esposito et al. ................. | 24/300 |
| 5,339,498 | 8/1994 | Parsons ........................ | 24/129 R |
| 5,467,507 | 11/1995 | Marsh et al. .................... | 24/300 |

*Primary Examiner*—Victor N. Sakran
*Attorney, Agent, or Firm*—Morse, Altman & Benson

[57] ABSTRACT

An adjustable tie-down stretch cord comprising an elastic rope and a pair of slidably-mounted hooks. The hooks have a cylindrical tubular member and an S-shaped hook member. The tubular member is provided with a specially-shaped bore and flared slot in the wall. The inner bore at a throat end has a diameter slightly larger than the diameter of the elastic rope and increases to a flared end. The flared slot extends from near the throat end to the flared end, increasing in width in a curved manner. The hook member has a hook portion and a rib portion. The elastic rope is formed of a plurality of elastic strands or sheets wrapped in a woven or braided, polypropylene, nylon, polyester, or cotton jacket. The hooks are retained on the rope by knobs formed by folding over and crimping each end of the rope using a hog ring.

30 Claims, 3 Drawing Sheets

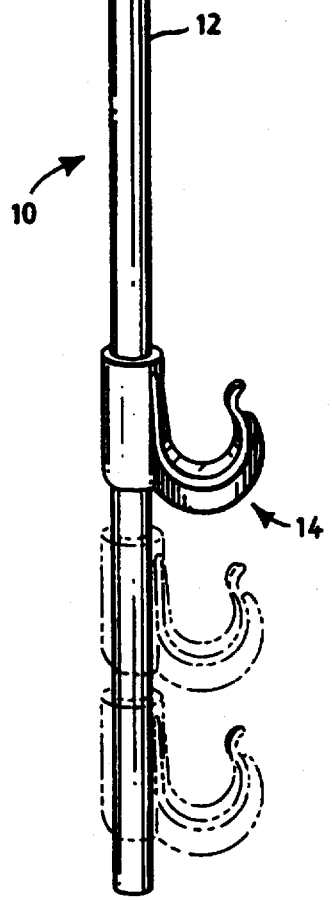
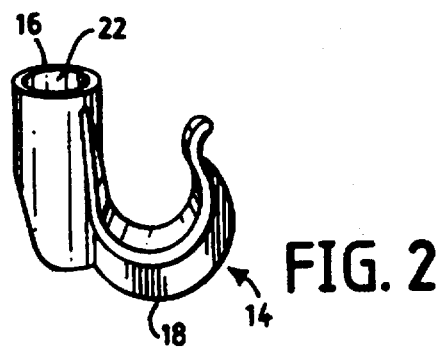
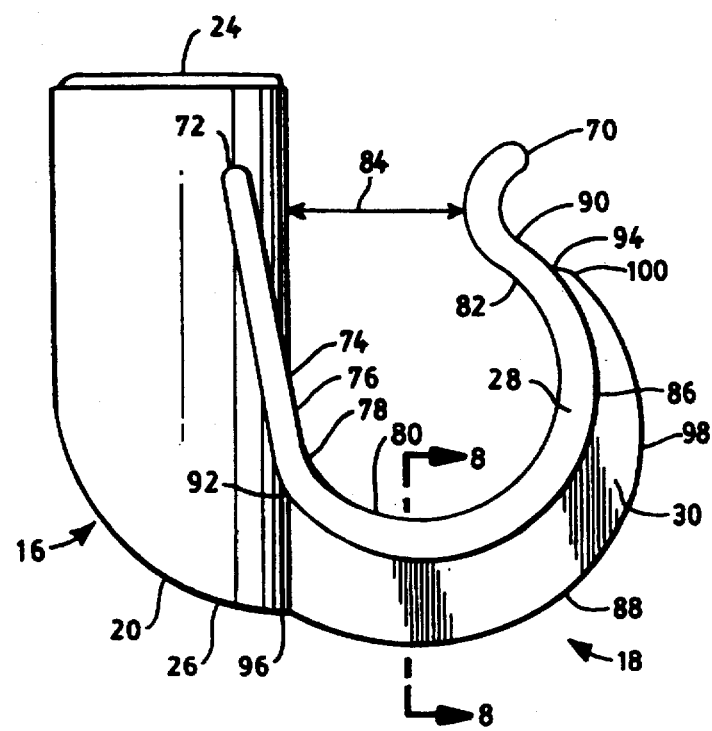

ADJUSTABLE TIE-DOWN STRETCH CORD

BACKGROUND OF THE INVENTION

Related Applications

The present application is a continuation-in-part application of application Ser. No. 08/351,487, dated Dec. 7, 1994 for VERSATILE ADJUSTABLE FASTENER SYSTEM in the names of Scott D. Brody and J. Scott Nelson.

1. Field of the Invention

The present invention relates generally to tie-down stretch cords and, more particularly, to an adjustable tie-down stretch cord to secure loads of widely differing geometries, sizes and weights to moving objects such as bicycles, motorcycles, cars, boats, trucks, and the like.

2. The Prior Art

Since time immemorial, man has needed some way to secure items, be they twigs, furs, produce, etc., into bundles when transporting them between points of gathering, storage, and/or use. With the discovery of the wheel and the advent of wagons, bicycles, automobiles, and boats, a variety of ways to achieve the temporary securing of items to one another and/or to a means of conveyance have evolved. In today's world, a person's most trusted manner of securing items includes the use of a rope to tie items into bundles and an elastic rope to secure the bundles to a carriage of some kind, such as a bicycle, automobile, or truck. Such an elastic rope is exemplified by the tie-down stretch cord, an elasticized rope having hooks fixed at both of its ends.

The tie-down stretch cord has a number of disadvantages. First is its lack of adjustability relative to the tension necessary to do the job. Since the hooks are permanently attached to each end of a fixed length of elastic rope, when a longer tie-down is needed, the rope must be stretched more, thus applying more pressure to the load than may be safe. Also, there is a fixed minimum length for the tie-down stretch cord that must be maintained to keep the hooks in place and the load secure.

The force that the tie-down stretch cord can withstand is limited. A load being held by a tie-down stretch cord is subjected to various dynamic forces, such as the bouncing associated with irregularities in the road surface. The typical tie-down stretch cord hook will deform and release at approximately 85 pounds of force. Even the heavy-duty tie-down stretch cords will only withstand approximately 120 pounds of force. Thus, even small items may need more than one tie-down stretch cord, if only to distribute the dynamic forces of transport rather than because of the size of the item.

In our present world where speed and mobility of both people and goods are at a premium, tie-down stretch cords must possess a plurality of features to be of widespread practical use. The tie-down stretch cords of today must be economical in manufacture, simple yet efficient in use, capable of re-use, and preferably useful in securing a wide variety of items of widely differing geometries, sizes and weights to various conveyances and in different and differing environments. That is a tall order that leaves plenty of room for improvements.

SUMMARY OF THE INVENTION

An object of the present invention is a tie-down stretch cord that is adjustable in order to secure loads of widely varying geometries, sizes, and weights to a variety of moving objects.

Another object of the present invention is an adjustable tie-down stretch cord that is easily and efficiently adjusted to a desired length.

The tie-down stretch cord comprises essentially an elastic rope on which a pair of hooks are slidably mounted. The hooks include a tubular member and a hook member. The tubular member is provided with a specially-shaped bore and flared slot in the wall. Preferably, the hooks are composed of a hard plastic material, such as 6, 6 nylon (polyhexamethylene adipamide).

The tubular member is cylindrical and is open at both the throat end and the flared end. The edge of the throat end is essentially convex with a shoulder at the outer and inner edges of the convex portion. Beginning at the throat end, the inner bore has a diameter slightly larger than the diameter of the elastic rope. For the preferred elastic rope having a 9 mm diameter, the bore diameter is 9.5 mm. The diameter increases at an angle of about 15° until it reaches a diameter of about 12 mm. The diameter remains about 12 mm for the remaining length of the tubular member to the flared end. Having a throat slightly larger than the diameter of the elastic rope restricts the radial movement of the rope in the throat, resulting in less stress on the rope and a longer useful life for the tie-down stretch cord.

The flared slot extends from the flared end to a distance of about 10 mm from the throat end. The flared slot increases in width in a curved manner symmetrically about a central line parallel to the axis of the tubular member. The flared slot is narrow at the closed end and the edges are almost parallel. The width of the slot increases toward the flared end, where the rate of increase also increases in a smooth curve. Concurrently with the increase in width, the flared slot edge gradually changes planes from parallel to the axis of the tubular member at the closed end to coincident with the edge of the flared end, thus normal to the axis of the tubular member.

The side profile of the flared slot initially is sloping at about a 15° angle from the flared end and gradually changing to a radius of curvature until it becomes parallel with the axis of the tubular member.

The hook member is formed with an integral hook portion and an integral rib portion, formed on the tubular member opposite the flared slot. The hook portion has a curvilinear shape, essentially a distorted "S". The rib portion is symmetrical about the plane that bisects the hook portion through its width. A cross-section of the hook member looks like a "T", with the hook portion forming the crossbar.

In one embodiment, the elastic rope is formed of a plurality of elastic strands wrapped in a woven or braided jacket. In another embodiment, the elastic rope is formed of a plurality of elastic sheets wrapped in a woven or braided jacket. The elastic sheets are bundled together randomly inside the jacket. In a third embodiment, the elastic rope is formed of a plurality of elastic strands or sheets wrapped in a pair of concentric woven or braided jackets. Preferably, for the above embodiments, the elastic strands and sheets are composed of virgin rubber and the jacket is composed of either polypropylene, nylon, polyester, or cotton. In a fourth embodiment, the elastic rope is formed solely of a single rubber line.

The tie-down stretch cord is a combination of two hooks and the elastic rope. The hooks are prevented from coming off the rope by a knob at each end of the rope. In the preferred embodiment, the knob is created by folding over each rope end and crimping the folded-over portion to the center portion. The preferred method for crimping the rope end is to compress a steel hog ring about the folded-over portions of rope. In another embodiment, the knobs are plastic shapes, preferably spherical, permanently attached to the ends of the elastic rope.

After the proper length for the stretch cord is determined, the tail portion of rope is pulled into the flared slot until the tail portion is bent at an angle of about 90°. The combination of the bend of the tail portion and the size of the slot make it extremely difficult to pull the rope from the slot by pulling on the rope extending from the throat end. In general, the larger the bend angle; the greater the force necessary to pull the tail portion out of the flared slot and the better the cord will hold. It is, however, relatively easy to remove the tail end from the slot in order to readjust the length. Using the preferred materials described above, the tie-down stretch cord of the present invention will withstand a linear force of up to 180 pounds before breaking or, as compared to the extra-strength tie-down stretch cord strength of about 120 pounds.

BRIEF DESCRIPTION OF THE DRAWINGS

For a fuller understanding of the nature and object of the present invention, reference is made to the accompanying drawings, wherein:

FIG. 1 is a perspective view of the tie-down stretch cord of the present invention;

FIG. 2 is a perspective view of a hook of FIG. 1;

FIG. 3 is a front elevational view of the hook of FIG. 2;

DETAILED DESCRIPTION

Figure 5:
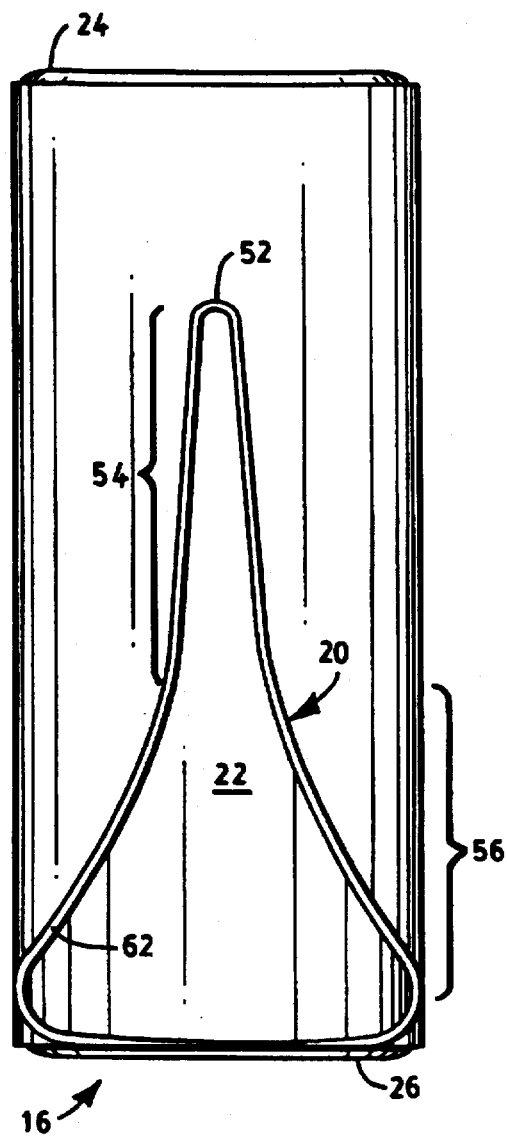
FIG. 5 is a side view of the tubular member of the hook of FIG. 2.

In general, the present invention pertains to an adjustable tie-down stretch cord for securing loads of widely varying geometries, sizes, and weights to a variety of moving objects. As shown in FIG. 1, the tie-down stretch cord 10 comprises essentially an elastic rope 12 on which a pair of hooks 14 are slidably mounted.

As shown in FIG. 2, the hooks 14 feature a tubular member 16 provided with a specially-shaped bore 22 and flared slot 20, and a hook member 18. Preferably, the hooks 14 are composed of a hard plastic material, such as 6, 6 nylon (polyhexamethylene adipamide). An example of such a plastic is manufactured by the ALBIS PLASTIC G.m.b.H., Hamburg, Germany, under the designation "ALBIS POLYAMID 66 PA 150/1." Preferably, the hard plastic hooks 14 can be effectively used over a temperature range from about −40° F. to about +220° F. These hard plastic hooks 14 are resistant to corrosion by ultraviolet light, ozone, salty air and salt water, and chemicals, and are also electrically nonconductive.

The tubular member 16 preferably is cylindrical, open at both the throat end 24 and the flared end 26, and is about 44 millimeters (mm) long and about 19 mm in diameter.

Figure 6:
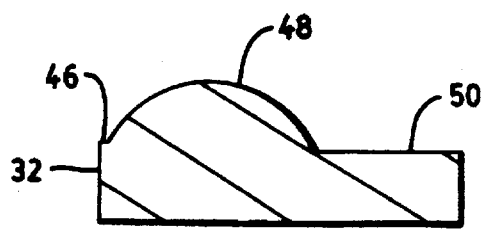
FIG. 6 is a fragmentary section, on an enlarged scale, of the component of FIG. 4 shown within a circle marked 6—6.

As in FIG. 6, at the edge of the throat end 24, is an outer shoulder 46 of width about 0.1 mm normal to the outer wall 32 of the tubular member 16. From the inner end of the outer shoulder 46 is a convex portion 48. The radius of curvature of the convex portion 48 is about 1.8 mm and ends at an inner shoulder 50 that is about 1.25 mm wide and normal to the outer wall 32.

Figure 4:
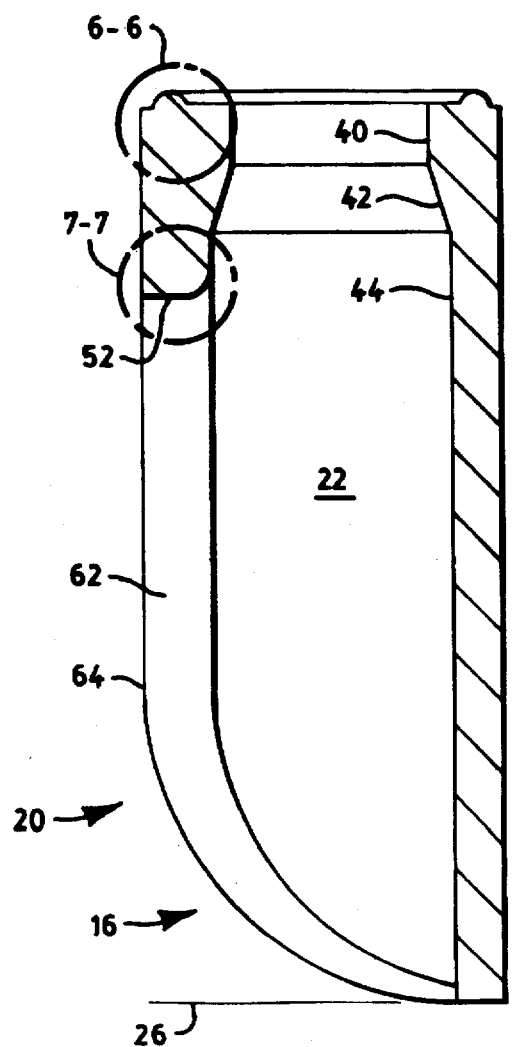
FIG. 4 is a front view in cross-section of the tubular member of the hook of FIG. 2.

As in FIG. 4, beginning at the throat end 24, the inner bore 22 preferably has a diameter, as at 40, that is slightly larger than the diameter of the elastic rope 12. In the preferred embodiment, the bore diameter 40 is about 9.5 mm for about 3.2 mm of length. The diameter increases at an angle of about 15°, as at 42, until it reaches a diameter of about 12 mm. The diameter remains about 12 mm for the remaining length of the tubular member 16 to the flared end 26, as at 44. The diameter at the throat end 40 and the angle 42 at which the diameter changes differ depending upon the diameter of the elastic rope 12. A throat end diameter 40 of 9.5 mm, as described, is the preferred diameter for an elastic rope 12 having a diameter in the range of from 8 mm to 9 mm. Having a throat slightly larger than the diameter of the elastic rope 12 restricts the radial movement of the rope 12 in the throat, resulting in less stress on the rope 12 and a longer useful life for the tie-down stretch cord 10.

The flared slot 20 commences from a closed end 52 at a distance of about 10 mm from the throat end 24 and extends all the way to the flared end 26, as in FIG. 5, which illustrates a frontal profile of the flared slot 20. The flared slot 20 increases in width in a curved manner symmetrically about a central line parallel to the axis of the tubular member 16. As at 54, the flared slot 20 increases from about 1.59 mm at the closed end 52, to about 2 mm at a point 5 mm from the closed end 52, to about 2.63 mm at a point 10 mm from the closed end 52, to about 3.25 mm at a point 15 mm from the closed end 52, to about 5.63 mm at a point 20 mm from the closed end 52. From this point, as at 56, the flared slot 20 increases width more rapidly with a radius of about 20.63 mm until, at the flared end 26, its width is the diameter of the flared end 26.

Figure 7:
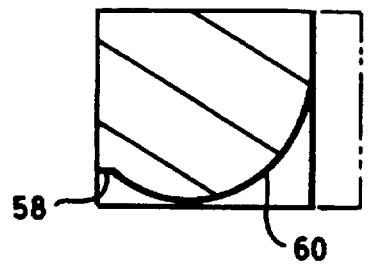
FIG. 7 is a fragmentary section, on an enlarged scale, of the component of FIG. 4 shown within a circle marked 7—7.

As in FIG. 7, at the closed end 52 is a shoulder 58 of width about 0.1 mm normal to the outer wall of the tubular member 16. From the inner end of the shoulder 58 to the inner wall of the tubular member 16 is a convex portion 60. The radius of curvature of the convex portion 60 is about 2.2 mm.

Concurrently with the increase in width of the flared slot 20, the flared slot edge 62 gradually changes planes from parallel to the axis of the tubular member 16 at the closed end 52 to coincident with the edge of the flared end 26, thus normal to the axis of the tubular member 16.

An illustrated side profile of the flared slot 20 is best observed in FIG. 4. The side profile initially is sloping at about a 15° angle from the flared end 26, gradually changing to a radius of curvature of about 16.25 mm, and then on to a radius of curvature of about 20.63 mm until it becomes parallel with the axis of the tubular member 16, as at 64. At that point it remains parallel to the tubular portion axis.

The hook member 18 is formed with an integral hook portion 28 and an integral rib portion 30, formed on the tubular member 16 opposite the flared slot 20, as shown in FIG. 3.

The hook portion 28 has a curvilinear shape, essentially a distorted "S", and a constant thickness of about 2.6 mm until about 1.3 mm from the tip 70. At about 1.3 mm from the tip 70, the thickness decreases in a semicircular curve of radius about 1.3 mm. As at 72, the hook portion 28 is attached to the tubular member 16 at a point about 7 mm from the throat end 24 and about 125° around from the center line of the flared slot 20. As at 72, the width of the hook portion 28 is about 17 mm and decreases in width to about 6 mm at about 2.5 mm from the tip 70. At about 2.5 mm from the tip 70, the width decreases in a semicircular curve of radius about 5 mm.

Beginning at point 72, the inner surface of the hook portion 28 extends linearly away from the throat end 24 at an angle of about 11° from the axis of the tubular member 16 for a distance of about 18.3 mm to point 74. The inner surface 76 then curves closer to parallel to the axis of the tubular member 16 at a radius of about 14.6 mm to point 78. The inner surface 74 then immediately reverses the curve with a radius of about 8.6 mm through an angle of about 45° to point 80. The curve continues with a radius of about 11.5 mm through an angle of about 180° to point 82. The inner surface 74 reverses the curve with a radius of about 6 mm through an angle of approximately 90° to about 1.5 mm from the tip 70. The resulting gap 84 at the narrowest point between the tubular member 16 and the hook member 18 is about 13 mm. In an alternate embodiment, the radius of curvature between points 78 and 82 are increased so that the gap 84 is larger, preferably about 25 mm. The portion of the inner surface 78 between points 78 and 82 is referred to as the operative surface, because this is the surface that makes contact with the portion of the vehicle to which the bundle is being secured.

Figure 8:
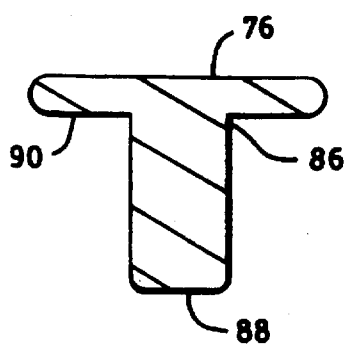
FIG. 8 is a cross-sectional view of the hook of FIG. 3 along the line 8—8.

The rib portion 30 has an inner edge 86 and an outer edge 88. As in FIG. 8, the rib portion 30 is symmetrical about the plane that bisects the hook portion 28 through its width, and is about 4.5 mm thick. The inner edge 86 is coincident with the outer surface 90 of the hook portion 28 from the point on the outer surface 90 where it intersects with the tubular wall of the tubular member 16, as at point 92, to a point opposite the final curve of the inner surface 76, as at point 94. The outer edge 88 follows a curvilinear path, beginning at the flared end 26, as at point 96, at an angle of about 105° from the tubular wall of the tubular member 16. The outer edge 88 curves with a radius of about 17 mm through an angle of about 90° to point 98. The curve continues with a radius of about 20 mm through an angle of about 45° to point 100. The curve continues with a radius of about 2 mm until the outer edge 88 makes contact with the outer surface 90 at point 94.

The rounded S shape described above as the preferred embodiment of the hook member is not intended as a limitation on the shape of the hook member. Any shape that can operate as a hook is contemplated by the present invention, such as squared S shapes, rounded U shapes, and squared U shapes.

There are several embodiments for the elastic rope 12. All of the preferred embodiments include an elastic core and a woven or braided jacket. The elastic core provides the stretch to the rope and the jacket provides the strength by limiting the amount of stretch that the core is permitted.

Figure 9:
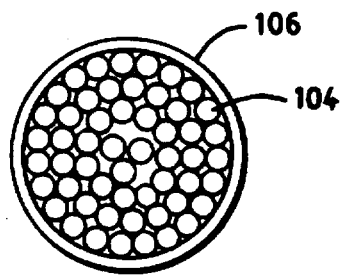
FIG. 9 is a cross-sectional view of one embodiment of the elastic rope of FIG. 1.

In the first embodiment, shown in FIG. 9, the core is formed of a plurality, typically 24, elastic strands 104 that are composed of virgin rubber. The jacket 106 is preferably composed of either polypropylene, nylon, polyester, or cotton.

Figure 10:
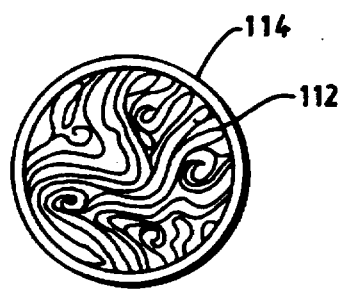
FIG. 10 is a cross-sectional view of another embodiment of the elastic rope of FIG. 1.

In another embodiment, shown in FIG. 10, the core is formed of a plurality of elastic sheets 112. The elastic sheets 112 are bundled together randomly inside the jacket 114. Preferably, the elastic sheets 112 are composed of virgin rubber and the jacket 114 is composed of either polypropylene, nylon, polyester, or cotton.

In a third embodiment, the core is composed of either elastic strands or elastic sheets, as described above, and, instead of one jacket, there are two jackets, one outside of the other. Two jackets provide more strength to the elastic rope.

In a fourth embodiment, the elastic rope 12 is formed of solely of a single rubber line without a jacket.

Figure 11:
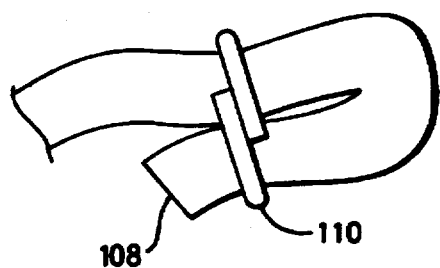
FIG. 11 is a perspective view, on an enlarged scale, of one end of the elastic rope of FIG. 1.

The tie-down stretch cord 10 is a combination of two hooks 14 and the elastic rope 12. The hooks 14 are positioned so that the rope 12 extends through the hook bores 22 and the hook throat ends 24 face each other. There is a knob at each end that is larger than the diameter of the bore 22 and prevents the hooks 14 from being removed from the rope 12. Preferably, the knob is formed by folding each rope end 108 and crimped the now-adjacent portions of rope 12, as in FIG. 11. The preferred method for crimping the rope end 108 is to compress a steel hog ring 110 about the adjacent portions of rope 12. In another embodiment, the knobs are plastic shapes permanently attached to the ends of the elastic rope. Preferably, the shapes are spherical.

OPERATION

FIG. 1 shows how the length of the tie-down stretch cord 10 is adjusted. After the proper length for the stretch cord is determined, the tail portion 116 of the rope 12 is pulled into the flared slot 20 until the tail portion 116 is bent at an angle of about 90°. In general, the larger the bend angle, the greater the force necessary to pull the tail portion 116 out of the flared slot 20 by pulling on the rope 12 extending from the throat end 24. Using the preferred materials described above, the adjustable tie-down stretch cord 10 of the present invention will withstand a linear force of up to 180 pounds before breaking or, as compared to the extra-strength tie-down stretch cord strength of about 120 pounds.

Thus it has been shown and described an adjustable tie-down stretch cord 10 designed to secure loads of widely differing geometries, sizes and weights to moving objects, which satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A tie-down stretch cord comprising:

(a) an elastic rope;
   (b) a pair of hooks having a cylindrical tubular member and a hook member, said tubular member having a throat end, a flared end, central bore having an axis, and a wall having an outer surface;
   (c) the diameter of said bore increasing in diameter from said throat end to said flared end;
   (d) said tubular member wall having a flared slot that is open at said flared end and symmetrical about a center line parallel to said axis, the edge of said slot gradually changing planes from parallel to the axis of said tubular member at a closed end to coincident with the edge of said flared end, and the side profile of said slot sloping gradually from said flared end, gradually changing the radius of curvature until said profile becomes coincident with said wall outer surface;
   (e) said hook member having an operative surface and being attached to said tubular wall outer surface approximately 180° around said wall outer surface from said flared slot center line and such that said operative surface is proximal to said flared end and extending away from said flared slot;

(f) said elastic rope extending through said tubular members of said pair of hooks with said throat ends facing each other; and (g) each end of said elastic rope having a knob that is larger than said bore diameter for retaining said hooks on said elastic rope.

2. The tie-down stretch cord of claim 1 wherein said rope has a substantially circular cross-section with a diameter in the range of from approximately 7 mm to approximately 11 mm.

3. The tie-down stretch cord of claim 1 wherein said rope has an elastic central core and an outer jacket.

4. The tie-down stretch cord of claim 3 wherein said central core is composed of a plurality of elastic strands.

5. The tie-down stretch cord of claim 3 wherein said central core is composed of a plurality of elastic sheets.

6. The tie-down stretch cord of claim 3 wherein said central core is composed substantially of virgin rubber.

7. The tie-down stretch cord of claim 3 wherein said outer jacket is woven.

8. The tie-down stretch cord of claim 3 wherein said outer jacket is braided.

9. The tie-down stretch cord of claim 3 wherein said outer jacket is composed substantially of a material selected from the group consisting of polypropylene, nylon, polyester, and cotton.

10. The tie-down stretch cord of claim 1 wherein said bore diameter at said throat end is slightly larger than the diameter of said rope.

11. The tie-down stretch cord of claim 1 wherein said hook member includes a hook portion and a rib portion, said hook portion having approximately an "S" shape.

12. The tie-down stretch cord of claim 11 wherein said rib portion extends outwardly from the outer surface of said hook portion over a majority of the length of said hook portion, said rib portion providing rigidity to said hook member.

13. The tie-down stretch cord of claim 1 wherein said knobs are formed by folding over a short portion of each of said elastic rope ends and clamping said short portion to a portion of said elastic rope to which it is adjacent.

14. The tie-down stretch cord of claim 13 wherein said short portion and said adjacent portion are clamped together by a hog ring.

15. The tie-down stretch cord of claim 1 wherein said knobs are permanently-attached spherical shapes.

16. The tie-down stretch cord of claim 1 wherein said hooks are composed substantially of polyhexamethylene adipamide.

17. A tie-down stretch cord comprising:

(a) an elastic rope having an elastic central core and an outer jacket;

(b) a pair of hooks having a cylindrical tubular member and a hook member, said tubular member having a throat end, a flared end, central bore having an axis, and a wall having an outer surface;

(c) the diameter of said bore increasing in diameter from said throat end to said flared end, said bore diameter at said throat end is slightly larger than the diameter of said rope;

(d) said tubular member wall having a flared slot that is open at said flared end and symmetrical about a center line parallel to said axis, the edge of said slot gradually changing planes from parallel to the axis of said tubular member at a closed end to coincident with the edge of said flared end, and the side profile of said slot sloping gradually from said flared end, gradually changing the radius of curvature until said profile becomes coincident with said wall outer surface;

(e) said hook member having an operative surface and being attached to said tubular wall outer surface such that said operative surface is proximal to said flared end;

(f) said elastic rope extending through said tubular members of said pair of hooks with said throat ends facing each other; and (g) the ends of said elastic rope having a knob that is larger than said bore diameter for retaining said hooks on said elastic rope.

18. The tie-down stretch cord of claim 17 wherein said rope has a substantially circular cross-section with a diameter in the range of from approximately 7 mm to approximately 11 mm.

19. The tie-down stretch cord of claim 17 wherein said central core is composed of a plurality of elastic strands.

20. The tie-down stretch cord of claim 17 wherein said central core is composed of a plurality of elastic sheets.

21. The tie-down stretch cord of claim 17 wherein said central core is composed substantially of virgin rubber.

22. The tie-down stretch cord of claim 17 wherein said outer jacket is woven.

23. The tie-down stretch cord of claim 17 wherein said outer jacket is braided.

24. The tie-down stretch cord of claim 17 wherein said outer jacket is composed substantially of a material selected from the group consisting of polypropylene, nylon, polyester, and cotton.

25. The tie-down stretch cord of claim 17 wherein said hook member includes a hook portion and a rib portion, said hook portion having approximately an "S" shape and being attached to said tubular portion approximately 180° around said wall outer surface from said flared slot center line, and said rib portion extending outwardly from the outer surface of said hook portion over a majority of the length of said hook portion, said rib portion providing rigidity to said hook member.

26. The tie-down stretch cord of claim 17 wherein said knobs are formed by folding over a short portion of each of said elastic rope ends and clamping said short portion to a portion of said elastic rope to which it is adjacent.

27. The tie-down stretch cord of claim 26 wherein said short portion and said adjacent portion are clamped together by a hog ring.

28. The tie-down stretch cord of claim 17 wherein said knobs are permanently-attached spherical shapes.

29. The tie-down stretch cord of claim 17 wherein said hooks are composed substantially of polyhexamethylene adipamide.

30. A tie-down stretch cord comprising:

(a) an elastic rope having a substantially circular cross-section with a diameter in the range of from approximately 7 mm to approximately 11 mm and having an elastic central core and a braided outer jacket, said central core being composed of a plurality of elastic strands composed substantially of virgin rubber and said outer jacket being composed substantially of a material selected from the group consisting of polypropylene, nylon, polyester, and cotton;

(b) a pair of hooks composed substantially of polyhexamethylene adipamide and having a cylindrical tubular member and a hook member, said tubular member having a throat end, a flared end, central bore having an axis, and a wall having an outer surface;

(c) the diameter of said bore increasing in diameter from said throat end to said flared end, said bore diameter at said throat end being slightly larger than the diameter of said rope;

(d) said tubular member wall having a flared slot that is open at said flared end and symmetrical about a center line parallel to said axis, the edge of said slot gradually changing planes from parallel to the axis of said tubular member at a closed end to coincident with the edge of said flared end, and the side profile of said slot sloping gradually from said flared end, gradually changing the radius of curvature until said profile becomes coincident with said wall outer surface;

(e) said hook member having an operative surface and being attached to said tubular wall outer surface such that said operative surface is proximal to said flared end, said hook member including a hook portion and a rib portion, said hook portion having approximately an "S" shape and being attached to said tubular portion approximately 180° around said wall outer surface from said flared slot center line, and said rib portion extending outwardly from the outer surface of said hook portion over a majority of the length of said hook portion, said rib portion providing rigidity to said hook member;

(f) said elastic rope extending through said tubular members of said pair of hooks with said throat ends facing each other; and (g) the ends of said elastic rope having a knob that is larger than said bore diameter for retaining said hooks on said elastic rope, said knobs being formed by folding over a short portion of each of said elastic rope ends and clamping said short portion to a portion of said elastic rope to which it is adjacent with a hog ring.

* * * * *